US007831262B2

(12) United States Patent
Bergstrom

(10) Patent No.: US 7,831,262 B2
(45) Date of Patent: Nov. 9, 2010

(54) SYSTEMS AND METHODS FOR INDICATING PRESENCE FOR AN ONLINE SERVICE WITH A MOBILE TELECOMMUNICATIONS DEVICE BASED ON MOVEMENT

(75) Inventor: Dean W. Bergstrom, West Linn, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 469 days.

(21) Appl. No.: 11/462,287

(22) Filed: Aug. 3, 2006

(65) Prior Publication Data
US 2008/0032665 A1 Feb. 7, 2008

(51) Int. Cl.
*H04W 72/00* (2009.01)
(52) U.S. Cl. ............. 455/456.3; 455/456.1; 455/404.2; 455/414.2; 455/432.1; 455/403; 701/200; 701/201; 701/206; 701/213
(58) Field of Classification Search ............. 455/456.1, 455/456.2, 456.3, 403, 565, 569.1, 456.4, 455/457, 404.2, 414.1–414.4, 550.1, 551, 455/552.1, 553.1, 554.1, 555, 556.2–561, 455/569.2; 701/201, 206, 213, 200
See application file for complete search history.

(56) References Cited
U.S. PATENT DOCUMENTS

| 6,947,571 | B1 | 9/2005 | Rhoads et al. | |
| 6,952,181 | B2 | 10/2005 | Karr et al. | |
| 7,065,184 | B2 * | 6/2006 | Vishik et al. | 379/88.02 |
| 7,277,713 | B2 * | 10/2007 | Landschaft et al. | 455/456.1 |
| 7,302,270 | B1 * | 11/2007 | Day | 455/456.1 |
| 7,310,532 | B2 * | 12/2007 | Knauerhase et al. | 455/456.1 |
| 2004/0203888 | A1 * | 10/2004 | Mikan | 455/456.1 |
| 2005/0148331 | A1 * | 7/2005 | Sharon et al. | 455/435.1 |
| 2005/0184875 | A1 | 8/2005 | Schmandt et al. | |
| 2006/0240872 | A1 * | 10/2006 | Yuan et al. | 455/564 |

* cited by examiner

Primary Examiner—Nick Corsaro
Assistant Examiner—Sarwat Chughtai
(74) Attorney, Agent, or Firm—Austin Rapp & Hardman

(57) ABSTRACT

A mobile telecommunications device is disclosed. The mobile telecommunications device may be configured for use with an online service provider. The mobile telecommunications device may include a processor. The mobile telecommunications device may include memory in electronic communication with the processor. Instructions may be stored in the memory for setting a presence based on the motion state of the mobile device. The instructions may be executable to connect to the online service provider. The instructions may be executable to determine whether the mobile telecommunications device is moving. The instructions may be executable to set the presence based on the motion state. The instructions may be executable to communicate the presence to the online service provider.

23 Claims, 7 Drawing Sheets

SYSTEMS AND METHODS FOR INDICATING PRESENCE FOR AN ONLINE SERVICE WITH A MOBILE TELECOMMUNICATIONS DEVICE BASED ON MOVEMENT

TECHNICAL FIELD

The present invention relates generally to mobile telecommunications devices. More specifically, the present invention relates to systems and methods for indicating presence for an online service with a mobile telecommunications device based on movement.

BACKGROUND

The use of computers in society has grown significantly over the recent decades. Computers have been increasingly integrated into homes, businesses, schools, etc. The use of computers in the business world has increased dramatically. Computers are being utilized to perform numerous business functions relating to communications, advertising, accounting, etc. Computers are also increasingly used in schools to further education. Students use computers to improve their skills in multiple subjects such as math, languages, art, etc. Similarly, computers are also being increasingly used in homes to assist in numerous tasks such as personal financing matters, correspondence, etc.

The use of computer networks has likewise increased at a rapid pace. Computer networks are a group of computers connected together in order to share information and/or tasks. There are numerous types of computer networks. One example is a local area network (LAN). Computer networks within companies allow co-workers to exchange and share information from one computer to another. Business tasks are completed at faster rates because the task may be shared by multiple computers connected to the network.

Individual computer networks may be further connected with other computer networks to create a larger network. The Internet has become the largest computer based global information system which is composed of thousands of interconnected computer networks. The dramatic increase of use of the Internet has changed the way in which society functions. The Internet allows users of computers anywhere in the world to have access to the information within this massive interconnected network.

There have been numerous services that have been provided through the Internet network to users. These "online services" allow users to have access to the information being provided over the Internet. Some online services allow users to locate and purchase merchandise that is provided through the Internet network. Other online services allow users to search for and purchase airline tickets from virtually any airline carrier that has provided ticket information through the Internet network. Online services have also changed the methods in which people may communicate. One example of this type of online service is instant messaging.

Instant messaging refers to the process of exchanging text messages between two or more people. Typically, instant messaging allows users to form a list of people with whom they wish to communicate. This list is typically called a "contact list," and most instant messaging services allow users to communicate with anyone on their contact list, assuming that the person is online at that given time. Generally, users will send an alert to those persons on their contact list who are online prior to engaging in a conversation. Most instant messaging services provide a text window where two or more users can type messages that both users can instantly view. The parties in the conversation typically see each line of text right after it is typed (line-by-line).

Instant messaging services not only allow users to send notes back and forth while online, they can also allow users to set up chat rooms to communicate with groups of users, and to share links to web sites as well as images, audio, and the like. To some people, instant messaging seems more like a telephone conversation than exchanging letters and has become very popular for both business and personal use. Instant messaging is often used as a way to avoid telephone tag, whether the communication continues as text messages or winds up as a traditional phone call.

Many of the online services provided over the Internet use a concept referred to as presence. Presence allows the user of the online service to indicate to other users of the online service whether he/she is "on-line" or "off-line." For example, online services such as instant messaging, use presence to indicate whether the user is on-line or off-line and the availability for communication, such as "available," "busy," or "out-to-lunch." Many of these instant messaging services will automatically convey an online status when the user's computer enters a certain state. For example, an instant messaging service may automatically convey the online status of "Away" when the computer shuts down or is put in the sleep or hibernate mode. Similarly, the instant messaging service may automatically convey the online status of "Available" when the computer returns to an active state from the sleep or hibernate mode or from being powered up by a user.

In addition to these online services, the increasing rate of demand for more efficient methods of communicating with others has led to the increased use of mobile telecommunications devices, such as cellular telephones. Cellular telephones provide users the ability to communicate by telephone without the restrictions of a wire-based telephone. Cellular telephone signals allow much more mobility to users of such mobile telephones.

Some mobile telecommunications devices, such as cellular telephones, also provide users the ability to engage in the numerous online services described previously. For example, cellular telephone users may participate in the online service of instant messaging. Users of cellular telephones enjoy basically the same benefits enjoyed by users of an instant messaging service on a traditional computer. Users of cellular telephones may now engage in instant messaging with multiple members of their contact list in virtually any location where the cell phone receives a signal. Cell phone users may also share images, audio, and the like that are stored in the cell phone memory through instant messaging.

Unfortunately, known systems and methods for engaging online services through mobile communications devices, such as cellular telephones, suffer from various drawbacks. Accordingly, benefits may be realized by improved systems and methods for using and accessing online services through cellular telephones. Similarly, benefits may be realized by improved systems and methods for the presence functionality inherit in many online services. Some exemplary systems and methods for online services through cellular telephones are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
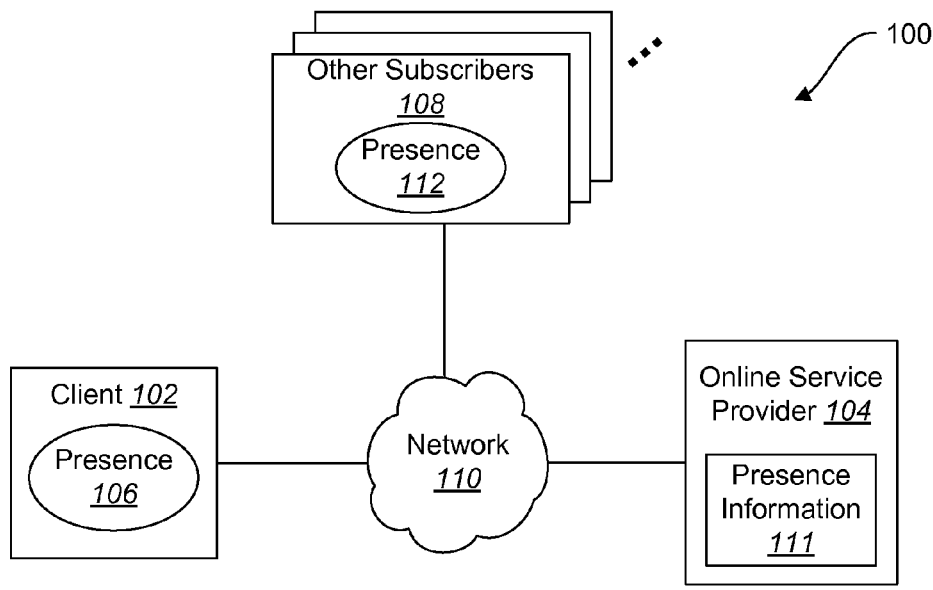
FIG. 1 is a block diagram of an online service provider in electronic communication with various subscribers.

A mobile telecommunications device is disclosed. The mobile telecommunications device is configured for use with an online service provider. The mobile telecommunications device includes a processor and memory in electronic communication with the processor. Instructions are stored in the memory for setting a presence based on a motion state of the mobile device. The instructions are executable to perform various functions. The mobile telecommunications device connects to the online service provider. The instructions determine whether the mobile telecommunications device is moving. The presence is set based on the motion state. The presence is communicated to the online service provider.

A method for setting a presence based on a motion state of the mobile telecommunications device is also disclosed. The mobile telecommunications device connects to an online service provider. The mobile telecommunications device determines whether the mobile telecommunications device is moving. The presence is set based on the motion state. The presence is communicated to the online service provider.

A system for providing presence of a mobile telecommunications device is disclosed. The system includes an online service provider that is in electronic communication with a network. The system also includes a plurality of subscribers to the online service provider. The system further includes a mobile telecommunications device that is configured for use with the online service provider. The mobile telecommunications device includes a processor and memory in electronic communication with the processor. Instructions are stored in the memory for setting a presence based on a motion state of the mobile telecommunications device. The instructions are executable to perform various tasks. The mobile telecommunications device connects to the online service provider. The instructions determine the motion state of the mobile telecommunications device. The instructions also set the presence based on the motion state. The presence is communicated to the online service provider. The online service provider receives the presence from the mobile telecommunications device and sends the presence to one or more of the plurality of subscribers.

In some embodiments, the mobile telecommunications device comprises a cellular telephone. In further embodiments, the cellular telephone is a location technology enabled cellular telephone. In still further embodiments, user settings are stored in the memory. In other embodiments, the user settings include preconfigured messages for a presence indicator.

In some embodiments, the presence indicates a first presence indication when the location technology enabled cellular telephone is moving and the presence indicates a second presence indication when the location technology enabled cellular telephone is stationary. In other embodiments, the motion state of the mobile telecommunications device changes if the location technology enabled cellular telephone is moving or stationary. In further embodiments, the first presence indication indicates that a user of the device is available and the second presence indication indicates that a user of the device is not available. In other embodiments, the presence is automatically changed based on the motion state.

In some embodiments, the online service provider is an instant messaging service, a chat room service, a video conferencing service, a virtual meeting service, a virtual whiteboard session, a push to talk session, or a presence aware phonebook. In further embodiments, the presence is communicated to the online service provider by an instant messenger application running on the mobile telecommunications device.

In some embodiments, motion monitor instructions are executed to determine the motion state of the mobile telecommunications device. In further embodiments, the executable instructions continue to monitor the motion state. In still further embodiments, the presence continues to update based on the motion state. In other embodiments, the presence is changed after waiting a time period when there has been a change in the motion state. In still further embodiments, the time period is reset if there has been a change in the motion state.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The present systems and methods enable the presence setting for a user of an online service that is using the service with a location technology enabled mobile telecommunications device to be set automatically by detecting whether the location technology enabled device is moving or stationary. Online services such as instant messaging use a concept called presence. Presence indicates whether the user is "on-line" or "off-line" and the availability for communication, such as "available", "busy," "idle," or "out-to-lunch". These services have become popular on the Internet as well as mobile handsets.

FIG. 1 is a block diagram of a system 100 that includes an online service provider 104 in electronic communication with various subscribers. One particular subscriber is illustrated as the client 102. When connected to and/or using the online service, the client has a presence 106. The presence 106 of the client 102 is communicated to the online service provider 104, which may then propagate the presence 106 of the client 102 to other subscribers 108 as needed.

The online service provider 104 is providing some service via the network 110 where presence is communicated to one or more subscribers 108. The subscribers 108, including the client 102 (the client 102 is also a subscriber to the online service), illustrated in the embodiment of FIG. 1 each have a presence 112, 106 which is communicated to the online service provider 104. The online service provider 104 stores and manages the presence information 111 of its subscribers 108, 102 and sends presence information 111 to subscribers 108, 102 as needed.

One example of an online service provider 104 is an instant messaging service. Other examples include, but are not limited to, chat room services, video conferencing services, virtual meeting services, virtual whiteboard sessions, push to talk sessions, presence aware phonebooks and the like.

The online service provider 104 is accessed via a communications network 110. The network 110 depicted in FIG. 1 may be embodied in a wide variety of configurations and may include a combination of multiple networks. The network 110 may include, for example, a cellular telephone network, a local area network (LAN), storage area networks (SANs), metropolitan area networks (MANs), wide area networks (WANs), and combinations thereof (e.g., the Internet). One combination of networks that may comprise the communications network 110 of FIG. 1 includes a cellular telephone network and the Internet.

Subscribers 108 typically include some form of computing device capable of connecting to the online service provider 104. A computing device, as used herein, is any device that includes a digital processor capable of receiving and processing data. A computing device includes the broad range of digital computers including microcontrollers, hand-held computers, mobile telecommunications devices, personal digital assistants, personal computers, servers, mainframes, supercomputers, and any variation or related device thereof.

The types of subscribers 108, 102 include mobile telecommunications devices, as will be more fully discussed below. Generally speaking, some mobile telecommunications devices include location technology, such as Global Positioning System (GPS), a compass, a gyroscope, or accelerometers. With a location technology enabled phone, typically the phone is stationary when the phone is not on the user and is moving when on the user. The systems and methods herein combine the ability of the handset to monitor the motion state of the device, and provide that information to an application executing on the handset, with the application's ability to maintain a presence state to an online service. The motion state of an object may include the object's inertial state. The inertial state is defined as the state of an object in an inertial reference frame, i.e. whether the object is being accelerated or is at rest. For example, an object, which is originally at rest, that is accelerated in any direction, either rotational or translational, experiences a change in inertial state.

Figure 2:
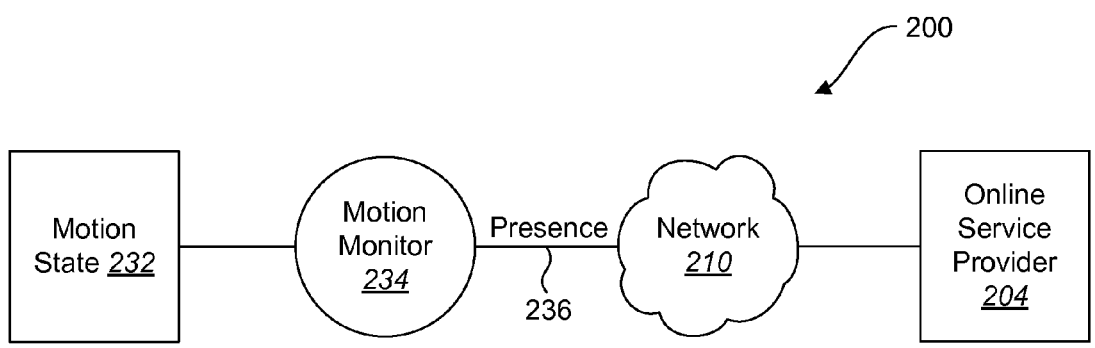
FIG. 2 is a block diagram illustrating the motion state of a mobile telecommunications device being used as a presence indicator.

FIG. 2 is a block diagram 200 illustrating the motion state 232 of the mobile telecommunications device (not shown in FIG. 2) being used as a presence indicator 236 for the online service provider 204. A motion monitor 234 monitors the motion state 232. The motion monitor 234 causes the presence indicator 236 to be communicated to the online service provider 204 via the communications network 210.

The motion state 232 indicates whether the phone is stationary or moving and may include the phone's inertial state. The motion state 232 may include a first presence indication when the location technology enabled cellular telephone is moving and a second presence indication when the location technology enabled cellular telephone is stationary. If the phone is initially stationary and then moves, for example translates or rotates, the motion state 232 may change from stationary to moving. The motion monitor 234 may include executable instructions that monitor the motion state 232 and cause the presence indicator 236 to change according to the motion state 232. This presence 236 is then communicated via the communications network 210 to the online service provider 204. A further discussion and illustration of the location technology enabled phone in the moving and stationary states is included with respect to FIGS. 6A, 6B, 7A and 7B.

Figure 3:
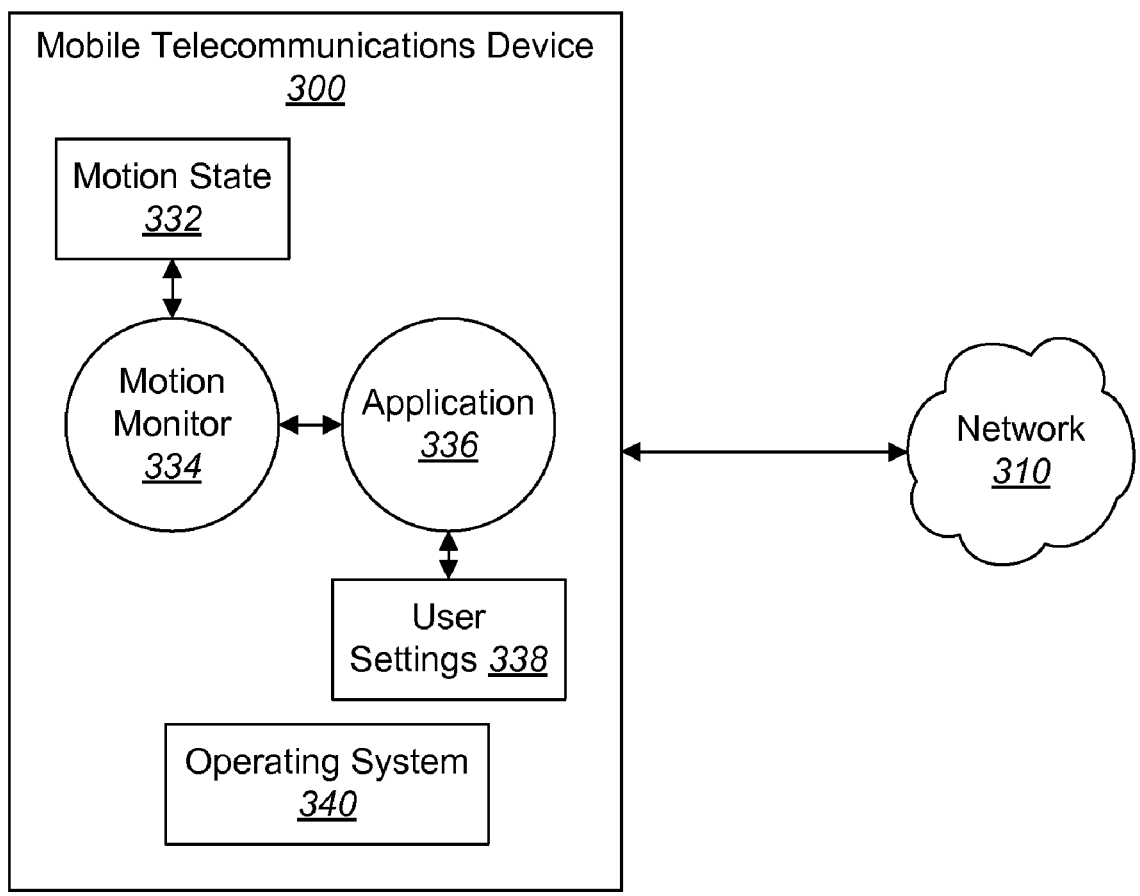
FIG. 3 is a more particular block diagram of a mobile telecommunications device using the motion state as a presence indicator.

FIG. 3 is a more particular block diagram of a mobile telecommunications device 300 using the motion state 332 to drive a presence indicator for an online service. This embodiment 300 illustrates the motion monitor 334 monitoring the motion state 332. The motion monitor 334 communicates the motion state 332 to an application 336 on the mobile telecommunications device 300.

The application 336 on the mobile telecommunications device 300 is a client application 336 for the online service provider 104. In the embodiment where instant messaging is the online service, the application 336 may be the instant messenger program that is running on the mobile telecommunications device 300. The application 336 updates the presence for the device 300 and sends it to the online service provider via the network 310.

User settings 338 on the mobile telecommunications device 300 may be used to configure the presentation of the presence indicator 236. In addition, user settings 338 may also be used to turn the motion state presence indication (or motion state presence mode) on and off. In other words, the user settings 338 may include data that indicates whether the user wants to enable the present systems and methods that allow the presence to be set by the motion state 332 of the device 300. There may be situations where the user does not want the presence to be set by the motion state 332 of the device 300. Waiting time periods, as discussed below with respect to FIG. 9, may also be configured and stored in the user settings 338.

Typically, modern mobile telecommunications devices 300 include a protocol stack 340 for the device 300. The application 336 uses the protocol stack 340 to communicate with the online service provider 104 via the network 310.

Since a stationary phone indicates the user of the device 300 is not in contact with the device or is not actively engaged or unavailable, the application 336 on the device 300 may detect this motion state 332 and automatically set the presence state in the online service. When the phone is moving it can be assumed the user is interactively engaged so he or she is "available". If the phone is stationary, the user is not available and the application 336 may set the presence to "unavailable," "idle," "busy," or some other previously defined, or user provided description (which may be stored in the user settings 338). This allows the presence to be easily and quickly set by the motion state 332 of the phone. Thus the user does not need to navigate through a variety of dialogs and menus to set the availability every time they are distracted from their device 300. A client application 336 using this concept will likely allow the user to enable or disable this automatic feature and be able to set the "unavailable" message ahead of time to a meaningful description, such as "idle," "busy," or "out to lunch". The user settings 338 may be used to set descriptions.

As mentioned, one possible online service is instant messaging. In order to use instant messaging, a user logs in to a messaging server using the instant messaging application (client) executing on the handset. Part of this online service is "presence". This indicates "online" or "offline", and if "online" the availability such as "available", "unavailable," "idle," or "busy". The client application maintains this state with the instant messaging server according to user preference.

The mobile telecommunications device, in one embodiment, is a cellular telephone. An embodiment of a mobile telecommunications device 400 is illustrated in the functional block diagram of FIG. 4. The system 400 includes a processor 402 that controls operation of the system 400. The processor 402 may also be referred to as a CPU. Memory 404, which may include both read-only memory (ROM) and random access memory (RAM), provides instructions and data to the processor 402. A portion of the memory 404 may also include non-volatile random access memory (NVRAM).

The system 400 also includes a housing 406 that contains a transmitter 408 and a receiver 410 to allow transmission and reception of data, such as audio communications, between the system 400 and a remote location, such as a cell site controller or base station. The transmitter 408 and receiver 410 may be combined into a transceiver 412. An antenna 414 is attached to the housing 406 and electrically coupled to the transceiver 412. Additional antennas (not shown) may also be used. The operation of the transmitter 408, receiver 410 and antenna 414 is well known in the art and need not be described herein.

The system 400 also includes a signal detector 416 used to detect and quantify the level of signals received by the transceiver 412. The signal detector 416 detects such signals as total energy, pilot energy per pseudonoise (PN) chips, power spectral density, and other signals, as is known in the art.

A state changer 426 of the system 400 controls the state of the wireless communication device based on a current state and additional signals received by the transceiver 412 and detected by the signal detector 416. The system 400 also includes a system determinator 428 used to control the wireless communication device and determine which service provider system the wireless communication device should transfer to when it determines the current service provider system is inadequate.

Figure 4:
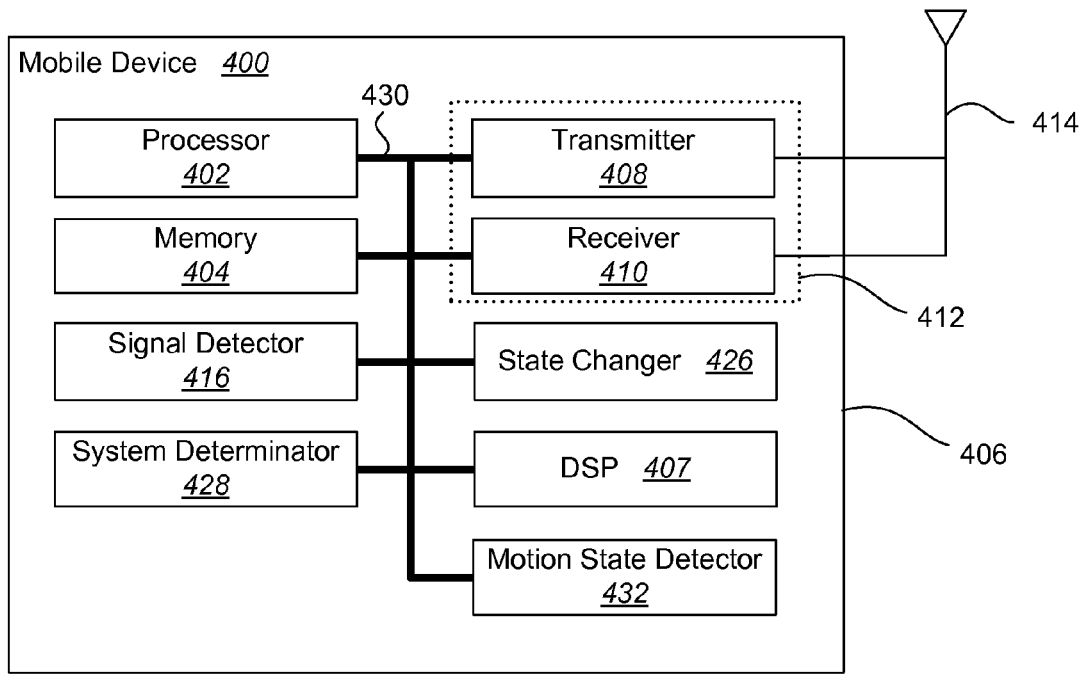
FIG. 4 is a functional block diagram of an embodiment of a mobile telecommunications device.

The various components of the system 400 are coupled together by a bus system 430 which may include a power bus, a control signal bus, and a status signal bus in addition to a data bus. However, for the sake of clarity, the various busses are illustrated in FIG. 4 as the bus system 430. The system 400 may also include a digital signal processor (DSP) 407 for use in processing signals. One skilled in the art will appreciate that the system 400 illustrated in FIG. 4 is a functional block diagram rather than a listing of specific components.

The system 400 may also include a motion state detector 432. The motion state detector 432 is hardware in the system that detects the state of the phone, whether moving or stationary. The motion state detector 432 may also cause a motion state in software to be set accordingly. In some embodiments, the motion state detector 432 may include location technologies such as GPS, a compass, a gyroscope, an accelerometer, or the like. In other embodiments, the motion state detector 432 may use a combination of location technologies, for example GPS and a compass. It is also possible that the motion state detector 432 may be read directly by a motion monitor 334. In some embodiments, the motion state detector 432 may be a location technology which detects, for the handset software, the motion state of the phone—moving or stationary. Typical uses of this may include determining the location of the phone, sensing whether the phone has been dropped, navigation, etc.

The motion state detector 432 may determine the motion state 332 determining whether the phone is moving or stationary. For example, in an embodiment where the motion state detector 432 uses multiple accelerometers, the accelerometers may determine whether the phone is being accelerated in any direction, i.e. translated or rotated. In an embodiment where the motion state detector 432 uses GPS, the GPS may determine whether the phone is either currently moving or has recently moved over a period of time.

In the systems herein, an application executing on the cell phone has access to this motion state. This application would be one that is associated with an online service, such as instant messaging, as is used in this example.

The methods disclosed herein may be implemented in an embodiment of a mobile device 400. In one embodiment, the methods described herein may be implemented through executable instructions stored in the memory 404 and executed by the processor 402.

Figure 5:
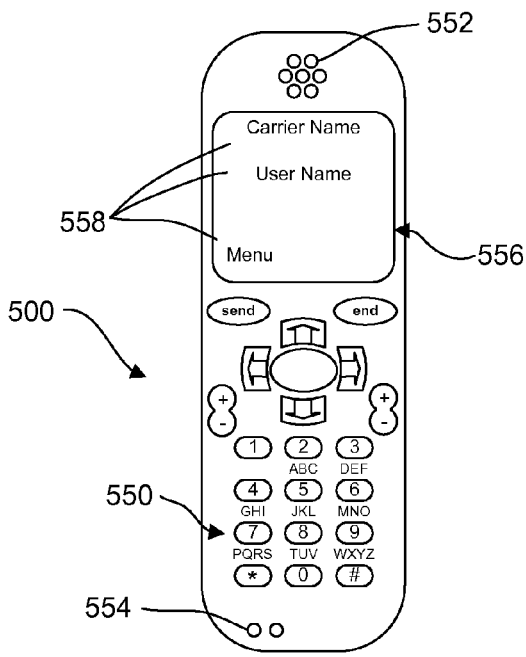
FIG. 5 is an illustration of one embodiment of a mobile telecommunications device.

FIG. 5 is an illustration of one embodiment of a mobile device 500. Mobile devices 500 typically include a number of buttons 550 or keys 550 that the user may use in operating the mobile device 500. The mobile device 500 also includes a speaker 552 and a microphone 554. A display 556 is used to provide messages 558 to the user.

Figure 6A:
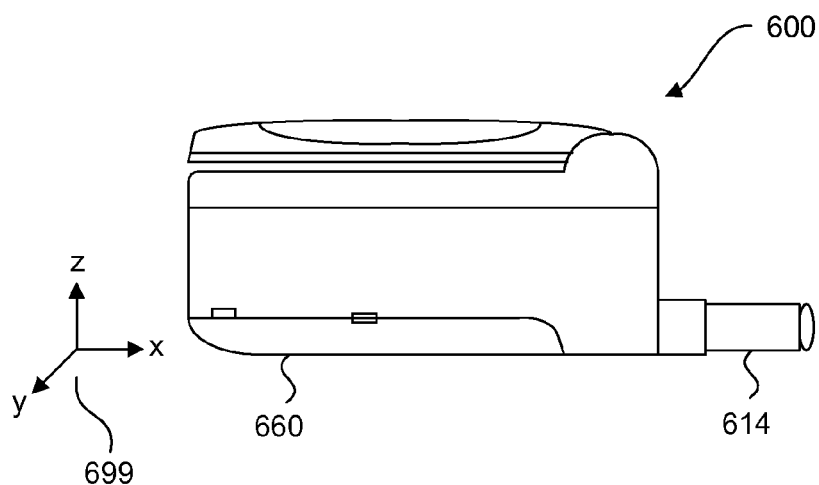
FIG. 6A is a side view of a mobile telecommunication device that is a location technology enabled phone at time $t_0$.

FIG. 6A is a side view of a mobile telecommunication device 600 that is a location technology enabled phone at time to. The location technology enabled phone 600 in FIG. 6A is not moving at time to, based on reference frame 699. As a result, the motion state in this embodiment 600 would indicate that the phone is stationary. Using the present systems and methods the presence of this device 600 at time to may accordingly be set to "away", "unavailable", "idle", "busy", etc. FIG. 6A also illustrates the antenna 614 and the battery 660 of the device 600.

Figure 6B:
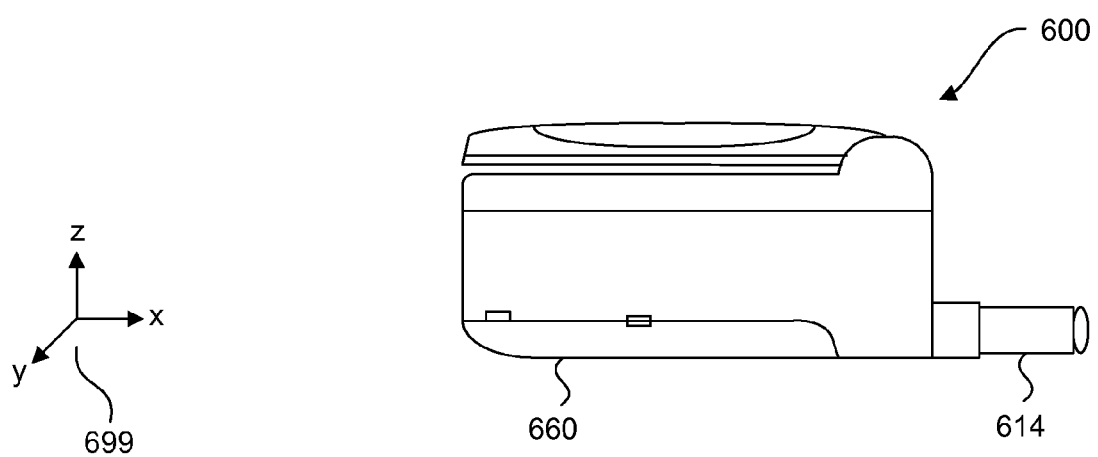
FIG. 6B is a side view of the mobile telecommunication device of FIG. 6A that is a location technology enabled phone at time $t_1$.

FIG. 6B is a side view of the mobile telecommunication device 600 of FIG. 6A that is a location technology enabled phone at time $t_1$. The location technology enabled phone 600 in FIG. 6B has translated from its initial translational coordinates $(x_0, y_0, z_0)$ based on reference frame 699 to new coordinates $(x_1, y_0, z_0)$; a distance of $x_1-x_0$. As a result, the motion state in this embodiment 600 between times to and t, may indicate that the phone is moving. If the phone stops moving at time $t_1$, the motion state at time $t_1$ may indicate that the phone is again stationary. Using the present systems and methods the presence of this device 600 between times $t_0$ and $t_1$ may accordingly be set to "available" or the like and at time $t_1$ may accordingly be set to "away", "unavailable", "idle", "busy", etc.

Figure 7A:
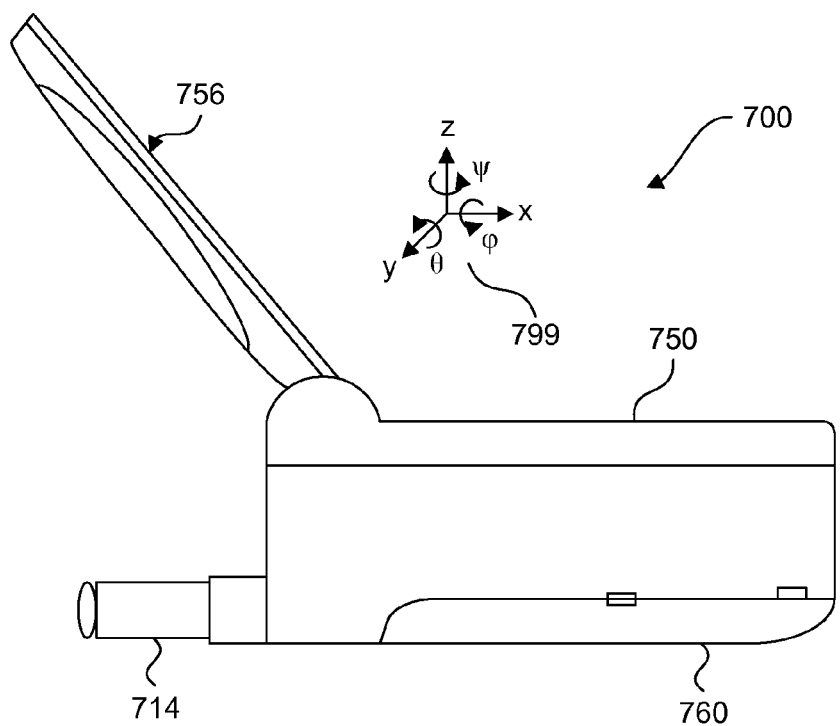
FIG. 7A is a side view of a mobile telecommunication device that is a location technology enabled phone at time $t_2$.

FIG. 7A is a side view of a mobile telecommunication device 700 that is a location technology enabled phone at time $t_2$. The location technology enabled phone 700 in FIG. 7A is not moving at time $t_2$, based on reference frame 799. As a result, the motion state in this embodiment 700 would indicate that the phone is stationary. Using the present systems and methods the presence of this device 700 would accordingly be set to "away", "unavailable", "idle", "busy", etc. FIG. 7A also illustrates the antenna 714 and the battery 760 of the device 700. When the phone 700 is open, the display 756 and the keypad 750 are exposed.

Figure 7B:
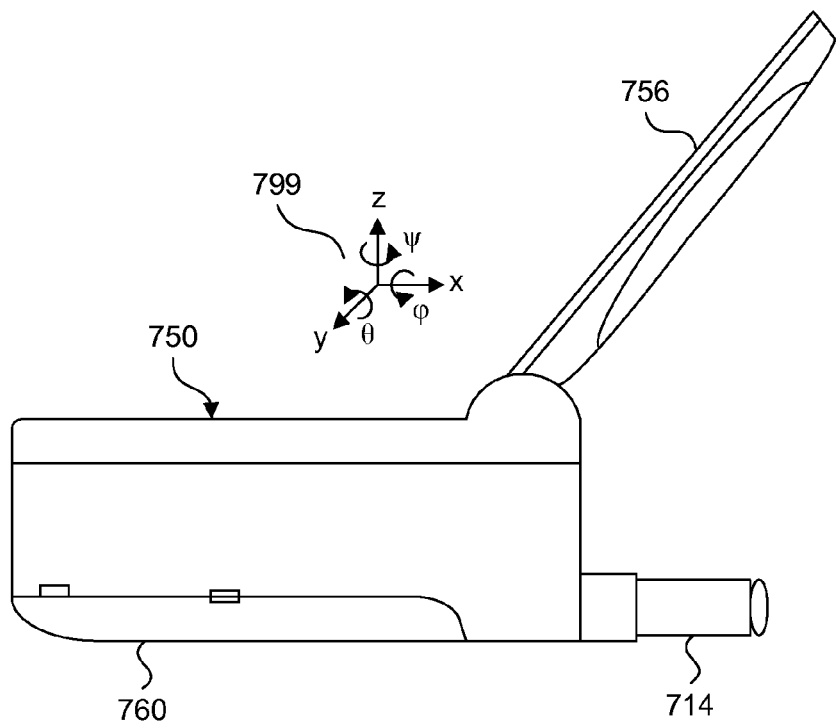
FIG. 7B is a side view of the mobile telecommunication device of FIG. 7A that is a location technology enabled phone at time $t_3$.

FIG. 7B is a side view of the mobile telecommunication device 700 of FIG. 7A that is a location technology enabled phone at time $t_3$. The location technology enabled phone 700 in FIG. 7B has rotated from its initial rotational coordinates $(\phi_0, \theta_0, \psi_0)$, based on reference frame 799, to new coordinates $(\phi_1, \theta_1, \psi_1)$; i.e. $\psi_0-\psi_1$, in this example 180 degrees. As a result, the motion state in this embodiment 700 between times $t_2$ and $t_3$ may indicate that the phone is moving. If the phone stops moving at time $t_3$, the motion state at time $t_3$ may indicate that the phone is again stationary. Using the present systems and methods the presence of this device 700 between times $t_2$ and $t_3$ would accordingly be set to "available" or the like and at time $t_3$ may accordingly be set to "away", "unavailable", "idle", "busy", etc.

Figure 8:
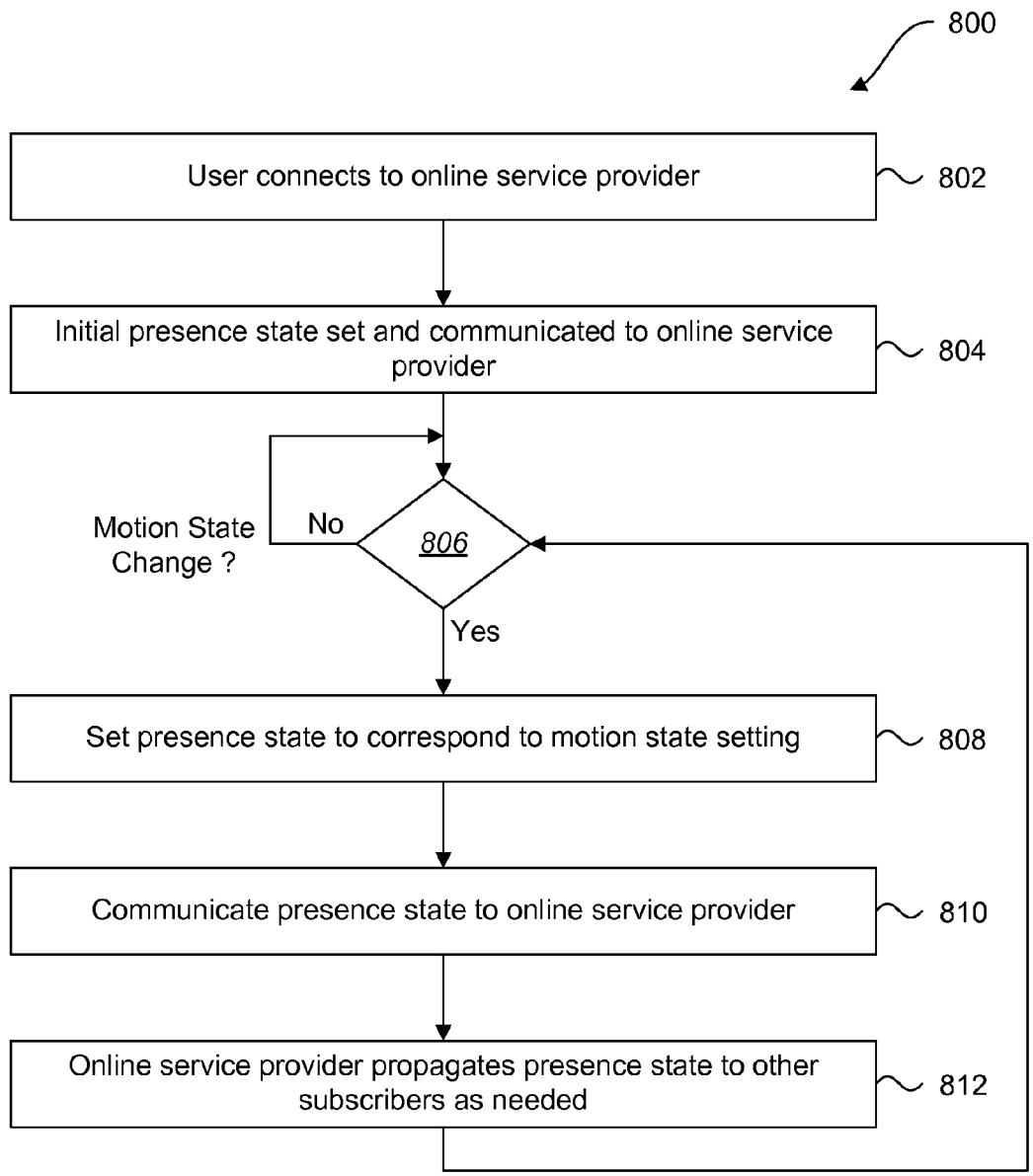
FIG. 8 is a flow diagram illustrating an embodiment of a method for using a motion state of a mobile telecommunications device to indicate presence.

FIG. 8 is a flow diagram illustrating an embodiment of a method 800 for using a motion state 332 of a mobile telecommunications device 300 to indicate presence. The user of the mobile telecommunications device 300 connects 802 to an online service provider 104. The initial presence state is set 804 and communicated to the online service provider 104. Then it is determined 806 if there was a change in the motion state 332 of the device 300. If there was not a change in the motion state 332 of the device 300, then the motion monitor 334 may simply continue to monitor the motion state 332 to determine 806 if there was a change in the motion state 332.

If there was a change in the motion state 332, then the presence state is set 808 to correspond to the motion state 332 setting. The new presence state is then communicated 810 to the online service provider 104. The online service provider 104 propagates 812 the presence state to other subscribers as needed.

Figure 9:
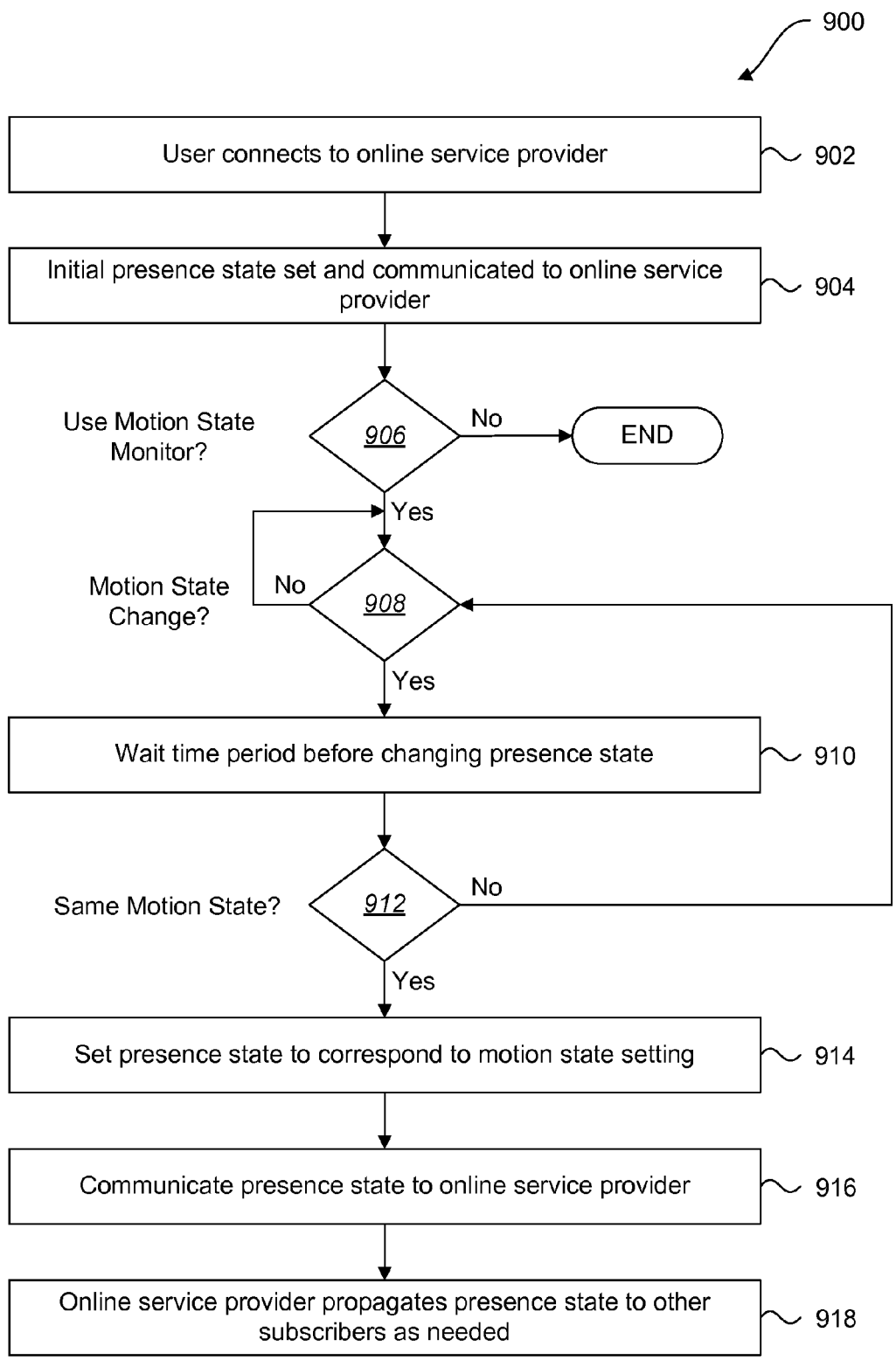
FIG. 9 is a flow diagram illustrating another embodiment of a method for using a motion state of a mobile telecommunications device to indicate presence.

FIG. 9 is a flow diagram illustrating another embodiment of a method 900 for using a motion state 332 of a mobile telecommunications device 300 to indicate presence. The user of the mobile telecommunications device 300 connects 902 to an online service provider 104. The initial presence state is set 904 and communicated to the online service provider 104. It is determined 906 if the motion state monitor 334 is being used to set the presence. If it is, then the process continues as shown. If it is not, the process ends. In some embodiments the user of the device 300 may configure the mobile telecommunications device 300 to use the motion state monitor 334 to set the presence, or he or she may turn off the motion state presence mode. If the motion state presence mode of the device 300 is turned off, the steps for accomplishing the motion state presence mode do not need to be followed and, as a result, the process ends.

Assuming that the motion state presence mode of the device 300 is turned on, then it is determined 908 if there was a change in the motion state 332 of the device 300. If there was not a change in the motion state 332 of the device 300, then the motion monitor 334 simply continues to monitor the motion state 332 to determine 908 if there was a change in the motion state 332.

If there was a change in the motion state 332, then the device 300 may wait 910 some period of time before changing the presence state. This embodiment with timing functionality may be used so that the change in presence will be made after some amount of time since the change in motion state 332. For example, if the motion state 332 indicates that the phone has been stationary for 5 minutes, the presence will change to "idle". This will avoid frequent or unnecessary changes to presence. After the period of time, it is determined 912 whether the motion state 332 is in the same state that caused the wait step 910 to be entered. If it is, then the presence state is set 914 to correspond to the motion state 332 setting. If the motion state 332 has changed, then the method returns to the step of monitoring 908 the motion state 332, as shown. In other embodiments, if the motion state 332 changes before the time period expires, the time period may be reset.

The new presence state is then communicated 916 to the online service provider 104. The online service provider 104 propagates 918 the presence state to other subscribers as needed.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A mobile telecommunications device that is configured for use with an online service provider, comprising:
    a processor;
    memory in electronic communication with the processor; and
    instructions stored in the memory for setting a presence based on a motion state of the mobile device, the instructions being executable to cause the processor to perform the process of:
    turn on or off a motion state presence mode;
    connect to the online service provider;
    determine whether the mobile telecommunications device is moving either via translation or rotation, wherein when the device is moving the device travels a distance and is not stationary, and wherein when the device is not moving the device is stationary;
    set the presence based on the motion state after waiting a period of time after detecting the movement of the device traveling the distance, wherein the period of time that is waited after detecting the movement of the device is selectable, and wherein the presence indicates either availability or unavailability; and
    communicate the presence to the online service provider, wherein if the motion state presence mode is turned on, the device will automatically set the presence without requiring navigation through menus on the device in order to set the presence of the device.

2. The mobile telecommunications device of claim 1, wherein the mobile telecommunications device comprises a cellular telephone.

3. The mobile telecommunications device of claim 2, wherein the cellular telephone is a location technology enabled cellular telephone.

4. The mobile telecommunications device of claim 3, wherein the motion state of the mobile telecommunications device changes if the location technology enabled cellular telephone is moving or stationary.

5. The mobile telecommunications device of claim 4, wherein the presence indicates a first presence indication when the location technology enabled cellular telephone is moving and wherein the presence indicates a second presence indication when the location technology enabled cellular telephone is stationary.

6. The mobile telecommunications device of claim 5, wherein the first presence indication indicates that a user of the device is available and wherein the second presence indication indicates that a user of the device is not available.

7. The mobile telecommunications device of claim 1, wherein the online service provider is selected from the group consisting of an instant messaging service, a chat room service, a video conferencing service, a virtual meeting service, a virtual whiteboard session, a push to talk session, and a presence aware phonebook.

8. The mobile telecommunications device of claim 7, wherein the presence is communicated to the online service provider by an instant messenger application running on the mobile telecommunications device.

9. The mobile telecommunications device of claim 1, further comprising motion monitor instructions that are executed to determine the motion state of the mobile telecommunications device.

10. The mobile telecommunications device of claim 1, further comprising user settings stored in the memory, wherein the user settings comprise preconfigured messages for a presence indicator.

11. The mobile telecommunications device of claim 1, wherein the mobile telecommunications device comprises a location technology enabled cellular telephone, and wherein the motion state of the mobile telecommunications device changes if the location technology enabled cellular telephone is moving or stationary, and wherein the presence is automatically changed based on the motion state.

12. The mobile telecommunications device of claim 1, wherein the executable instructions are further executable to continue to monitor the motion state.

13. The mobile telecommunications device of claim 11, wherein the executable instructions are further executable to continue to update the presence based on the motion state.

14. The mobile telecommunications device of claim 13, wherein the time period is reset if there has been a change in the motion state.

15. In a mobile telecommunications device, a method for setting a presence based on a motion state of the mobile telecommunications device comprising:
- turning on a motion presence state mode;
- connecting to an online service provider;
- determining the motion state of the mobile telecommunications device by determining whether the device is moving either via translation or rotation, wherein when the device is moving the device travels a distance and is not stationary, and wherein when the device is not moving the device is stationary;
- setting the presence based on the motion state after waiting a period of time after detecting the movement of the device traveling the distance, wherein the period of time that is waited after detecting the movement of the device is selectable, and wherein the presence indicates either availability or unavailability; and
- communicating the presence to the online service provider, wherein if the motion state presence mode is turned on, the device will automatically set the presence without requiring navigation through menus on the device in order to set the presence of the device.

16. The method of claim 15, wherein the mobile telecommunications device comprises a location technology enabled cellular telephone.

17. The method of claim 16, wherein the presence indicates that a user of the device is available when the location technology enabled cellular telephone is moving and wherein the presence indicates that a user of the device is not available when the location technology enabled cellular telephone is stationary.

18. The method of claim 17, wherein the online service provider is selected from the group consisting of an instant messaging service, a chat room service, a video conferencing service, a virtual meeting service, and a virtual whiteboard session, a push to talk session, and a presence aware phonebook.

19. A system for providing presence of a mobile telecommunications device, the system comprising:
- an online service provider that is in electronic communication with a network;
- a plurality of subscribers to the online service provider; and
- a mobile telecommunications device that is configured for use with the online service provider, comprising: a processor;
- memory in electronic communication with the processor; and
- instructions stored in the memory for setting a presence based on a motion state of the mobile telecommunications device, the instructions being executable to cause the processor to perform the process of:
- turn on or off a motion state presence mode;
- connect to the online service provider;
- determine whether the mobile telecommunications device is moving either via translation or rotation, wherein when the device is moving the device travels a distance and is not stationary, and wherein when the device is not moving the device is stationary;
- set the presence based on the motion state after waiting a period of time after detecting the movement of the device traveling the distance wherein the period of time that is waited after detecting the movement of the device is selectable, and wherein the presence indicates either availability or unavailability; and
- communicate the presence to the online service provider, wherein if the motion state presence mode is turned on, the device will automatically set the presence without requiring navigation through menus on the device in order to set the presence of the device; and
- wherein the online service provider receives the presence from the mobile telecommunications device and sends the presence to one or more of the plurality of subscribers.

20. The system of claim 19, wherein the mobile telecommunications device comprises a location technology enabled cellular telephone.

21. The mobile telecommunications device of claim 1, wherein the mobile telecommunications device comprises a cellular telephone, wherein the cellular telephone is a location technology enabled cellular telephone, wherein the presence indicates a first presence indication when the location technology enabled cellular telephone is moving and wherein the presence indicates a second presence indication when the location technology enabled cellular telephone is stationary, wherein the executable instructions are further executable to continue to update the presence based on the motion state, wherein the time period is reset if there has been a change in the motion state, and wherein the presence is communicated to the online service provider by an instant messenger application running on the mobile telecommunications device.

22. The mobile telecommunications device of claim 1, wherein the mobile telecommunications device comprises a cellular telephone, wherein the cellular telephone is a location technology enabled cellular telephone, wherein the presence indicates a first presence indication when the location technology enabled cellular telephone is moving and wherein the presence indicates a second presence indication when the location technology enabled cellular telephone is stationary, wherein the executable instructions are further executable to continue to update the presence based on the motion state, wherein after the time period has concluded, it is determined whether the device is in the same state as it was when the time period began period, and wherein the presence is communicated to the online service provider by an instant messenger application running on the mobile telecommunications device.

23. The mobile telecommunications device of claim 1, wherein the mobile telecommunications device comprises a cellular telephone, wherein the cellular telephone is a location technology enabled cellular telephone, wherein the presence indicates a first presence indication when the location technology enabled cellular telephone is moving and wherein the presence indicates a second presence indication when the location technology enabled cellular telephone is stationary, wherein the executable instructions are further executable to continue to update the presence based on the motion state, wherein the presence is communicated to the online service provider by an instant messenger application running on the mobile telecommunications device, and wherein when the device is moved, the device travels from coordinates $X_0, Y_0, Z_0$ (measured at time $t_0$) to coordinates $X_1, Y_1, Z_1$ (measured at time $t_1$) that defines the distance.

* * * * *

UNITED STATES PATENT AND TRADEMARK OFFICE
CERTIFICATE OF CORRECTION

PATENT NO.       : 7,831,262 B2
APPLICATION NO.  : 11/462287
DATED            : November 9, 2010
INVENTOR(S)      : Dean W. Bergstrom It is certified that error appears in the above-identified patent and that said Letters Patent is hereby corrected as shown below:

In column 9, line 12 please delete "to" and replace it with -- $t_0$ --.
In column 9, line 13 please delete "to" and replace it with -- $t_0$ --.
In column 9, line 16 please delete "to" and replace it with -- $t_0$ --.
In column 9, line 26 please delete "to and t," and replace it with -- $t_0$ and $t_1$ --.

Signed and Sealed this
Nineteenth Day of April, 2011

David J. Kappos
*Director of the United States Patent and Trademark Office*